H. P. DACHSEL.
FLOUR SIFTER ATTACHMENT.
APPLICATION FILED MAR. 31, 1917.
1,314,467.
Patented Aug. 26, 1919.
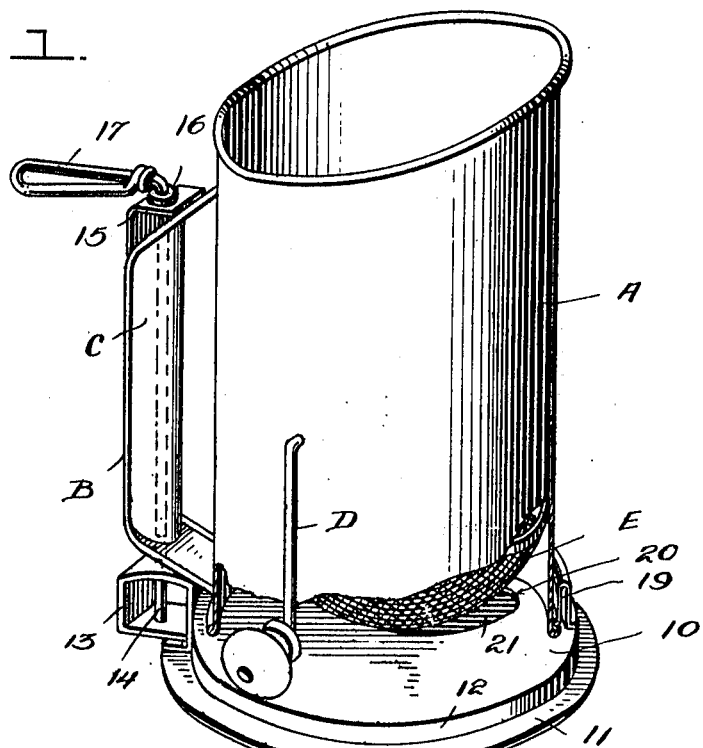
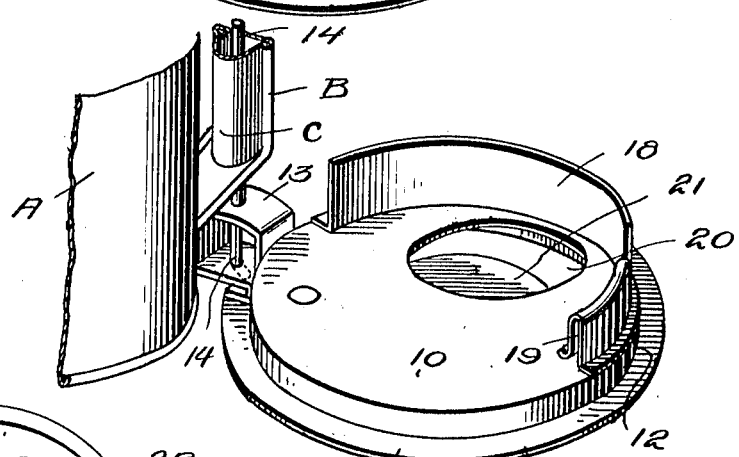
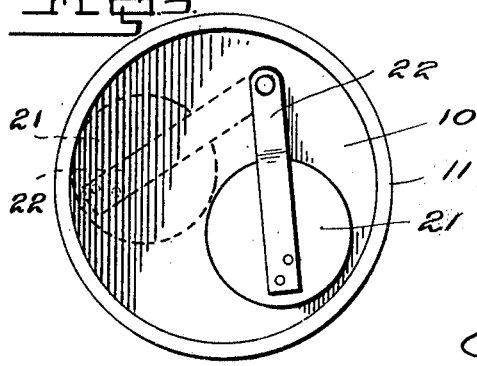
Inventor
Harry P. Dachsel
Attorney

UNITED STATES PATENT OFFICE.

HARRY P. DACHSEL, OF MOUNTAIN VIEW, ARKANSAS.

FLOUR-SIFTER ATTACHMENT.

1,314,467.  Specification of Letters Patent.  Patented Aug. 26, 1919.

Application filed March 31, 1917. Serial No. 158,997.

*To all whom it may concern:*

Be it known that I, HARRY P. DACHSEL, a citizen of the United States, and a resident of Mountain View, in the county of Stone and State of Arkansas, have invented a certain new and useful Improvement in Flour-Sifter Attachments, of which the following is a specification.

The present invention relates to kitchen utensils, and particularly to an attachment for application to flour sifters of the usual construction.

An object of the present invention is to provide an attachment for flour sifters which not only affords a substantial base or support for the same when not in use, but which also provides means for adapting the sifter for use over relatively small receptacles, such as cups when it is desired to sift flour into the same, and for the purpose of preventing waste in the flour sifting, and the loss of time in collecting the spilled flour and in adjusting the sifter to the relatively small receptacle.

Another object of the present invention is to provide an attachment of this character which is so arranged upon the flour sifter that the attachment may be operated by the thumb or finger which holds the sifter in the usual manner, to adjust the attachment into and out of engagement with the bottom of the sifter so that the same may be quickly and easily applied to large and small receptacles.

The invention further aims at the provision of a simply and economically constructed device which may be made from sheet metal, which conforms to the general contour or outlines of the sifter, which does not add materially to the weight of the sifter, and which provides for the economical handling of the flour or other material sifted.

The above, and various other objects and advantages of this invention will be in part described, and in part understood, from the following detailed description of the present preferred embodiment, the same being illustrated in the accompanying drawing wherein:

Figure 1 is a perspective view of a flour sifter having the attachment of this invention applied thereto, the bottom of the flour sifter being partly broken away to show the application of the same to the attachment, and the attachment being shown in operative position beneath the sifter.

Fig. 2 is a detail perspective view of the attachment moved out of operative relation with respect to the lower end of the sifter, a fragment of the latter being shown.

Fig. 3 is a bottom plan view, on a reduced scale, of the attachment having parts thereof removed, and showing the regulating valve in the bottom of the attachment.

Referring to this drawing, A designates the barrel or body portion of a sifter of usual construction which is cylindrical in form and provided with an open top and an open bottom. The cylinder A is provided at one side with a vertically arranged handle B of the usual strap type, and which is provided in the usual manner with a semi-tubular grip portion C arranged within the handle B adapted to rest in the hand of the user to afford a firm grip upon the handle B. The usual stirring handle or crank arm C projects from one side of the body A, and the latter has in its lower end a sieve or screen D of the usual form arranged within the lower open end of the body A.

The attachment comprises a base plate 10 having a flat uninterrupted upper surface and provided with a marginal depending offset flange 11 forming an annular marginal shoulder 12 at the juncture of the flange 11 with the base plate. At one side, the flange 11 is provided with an attaching ear 13, soldered or otherwise suitably secured to the flange 11 and bearing against the shoulder 12 to reinforce the ear 13. The ear 13 is formed of stock metal which is preferably overturned or bent upon itself into substantially rectangular form. The ear 13 is adapted to be placed beneath the handle B in vertical line with the tubular portion C thereof, and a stem 14, secured at its lower end through the ear 13, projects upwardly through the handle B. The lower end of the stem 14 is preferably rigidly secured in the ear 13 to turn therewith, and to support the ear and the base plate upon the lower end of the sifter.

The handle B is provided upon its upper end with a bearing portion 15 in the form of an angle plate which rests at its opposite free ends against the vertical and inclined portion of the handle B to provide a relatively flat upper surface through which the stem 14 is adapted to project. A retaining washer or collar 16 is secured about the upper end of the stem 14 against the bracket piece 15 to hold the stem 14 from sliding downwardly through the handle B.

The upper extremity of the stem 14, beyond the collar 16, is bent outwardly from the cylinder A and may be returned upon itself to provide a thumb or finger-engaging handle or projection 17.

The base 10 is provided at one side with an upstanding flange or rim 18 rising from the marginal edge portion of the base 10 and adapted to receive therein the lower extremity of the cylinder A when the attachment is in closed position beneath the sifter. The flange 18 also limits the swinging movement of the base 10 beneath the cylinder and determines the closed position of the attachment beneath the cylinder. A spring lip 19 is formed on one end of the flange 18 of the continuation thereof, and is preferably located at a point remote from the ear 13. The spring lip 19 is overturned inwardly and provided with a partially rolled portion adapted to engage the bead upon the lower end of the cylinder A and yieldingly hold the latter in closed position against the arcuate flange 18.

The base 10 is provided, preferably toward one side thereof, with a relatively small opening 20 formed therethrough which opening 20 is adapted to be closed, and to be regulated in size to restrict the passage of flour or other material being sifted through the opening 20, by means of a disk valve 21 slidably mounted against the under side of the base 10 above the plane of the outstanding flange 11. The disk valve 21 is preferably mounted upon a strap 22, the latter being pivoted at one end against the underside of the base 10 at one side of the opening 20. The strap 22 is adapted to be swung into various positions to hold the disk valve 21 in various positions beneath the opening 20. The adjustment of the disk valve 21 restricts the flow of the flour downwardly through the base 10 so that the latter may be placed over a relatively small receptacle and the sifted flour will be fed directly into the same and held by the base 10 from spilling over the sides of the receptacle.

The base member therefore is substantially hollow and contains the valve 21 and its strap 22 therein, the latter being out of the way, and the positioning of the base 10 upon a receptacle or the like not damaging or interfering with the adjustment of the valve 21. As the bottom of the base member is opened, the fingers may be readily inserted upwardly for engagement with the strap 22 to swing the same in various adjusted positions for controlling the passage of the flour through the opening 20.

In use, the attachment is adapted to be normally held by the spring lip 19 in the position shown in Fig. 1 so that the sifter may be set upon a table or the like and held in upright position and from tilting or being easily knocked over. When it is desired to sift flour into a relatively large receptacle, it is only necessary to provide the handle B in the usual manner and engage the thumb or finger against the projection 17, swinging the latter in the desired direction to turn the stem 14 and move the base 10 from beneath the cylinder A. It is necessary to exert sufficient pressure upon the projection 17 to overcome the tension of the spring lip 19 and to thus free the cylinder from the base. The projection 17 is swung to one side to move the base member from beneath the cylinder A, as shown in Fig. 2, so that the cylinder A may be placed over, or held over a relatively large receptacle into which the flour is adapted to be sifted.

When it is desired to sift the flour into a relatively small receptacle, such as a cup, it is only necessary for the operator to insert the fingers beneath the base portion and move the strap 22 to the desired position for opening the passage 20 to the desired extent. In this instance, the base member is not swung from beneath the cylinder A, but the handle B is grasped and the base is set over the cup or other small receptacle and the handle B operated in the usual manner for sifting the flour. The flour is confined by the base portion 10 in the lower end of the cylinder A, and the flour is permitted to pass in a restricted stream through the opening 20 into the receptacle. The lower edge of body A wipes over base 10 and removes the material.

It is readily seen that by the use of this device the flour is held from spilling over the sides of the small receptacle, and that considerable time may be saved in the handling of the flour. By the provision of the projection 17 at the upper end of the handle B, the device may be easily and quickly swung into and out of position for the ready application of the sifter to receptacles varying in size.

It is of course understood that various changes and modifications may be made in the details of construction of the above-specifically outlined sifter attachment without departing from the spirit of the invention, and being restricted only by the scope of the following claims.

I claim:—

1. An attachment for a flour sifter having the usual handle at one side thereof, comprising a base hinged upon the handle and adapted to be swung beneath the sifter for closing the lower end thereof, said base having a relatively small opening therethrough restricting the flow of material from the sifter, and means upon the handle adapted for engagement with the hand for moving the base into and out of position beneath the sifter.

2. An attachment for a flour sifter, having a handle, a movable element mounted on the handle for engagement with the fingers, a closure member connected to said movable element and adapted to be moved thereby into and out of engagement with the lower end of the sifter, and a valve carried by the closure member for controlling the passage of material therethrough.

3. A sifter attachment comprising a plate, a stem secured to one side of the plate and projecting upwardly therefrom, means for securing said stem in the handle of the sifter, a projection carried by the stem adjacent said handle for engagement with the fingers to swing the plate into and out of position beneath the sifter, and means for yieldingly holding the plate beneath the sifter.

4. A sifter attachment comprising a plate, means for hingedly connecting the plate to the lower end of the sifter, means for swinging the plate into and out of engagement with the lower end of the sifter, a positioning flange carried by said plate for engagement with the sifter to retain the plate in position beneath the sifter, and means for yieldingly holding the plate in adjusted position.

5. In an attachment for a sifter having a handle at one side thereof, the combination of a disk, a stem projecting upwardly from one edge of the disk, means for pivotally mounting the stem in said handle for holding the disk against the bottom of the sifter, means for turning said stem to swing the disk in an edgewise direction into and out of engagement with the bottom of the sifter, a stop flange carried by the disk for engagement with the side of the sifter, and a spring lip carried upon the disk for engagement with the lower end of the sifter to retain the disk in adjusted position.

6. In an attachment for a sifter provided with a handle at one side thereof, the combination of a disk, a stem projecting upwardly from one edge of the disk and adapted for engagement through said handle, means for pivotally holding the stem in said handle, a projection extending laterally from the stem at the top of the handle and adapted to be engaged by a finger of the hand grasping the handle, a stop flange carried by said disk for engagement against one side of the sifter, and a spring lip carried by the disk for engagement with the sifter to yieldingly hold the disk therebeneath.

7. In an attachment for a sifter provided with a handle at one side, of a disk, a supporting and actuating member carried at one side of the disk for engagement with said handle and adapted to be actuated by the hand grasping the handle to move the disk into and out of contact with the bottom of the sifter, said disk being provided with a relatively small opening therethrough adapted to register beneath said sifter, a strap pivoted at one end to the disk, and a valve carried upon the outer end of the strap and adapted to be swung therewith for engagement over said opening to control the flow of material downwardly therethrough.

HARRY P. DACHSEL.

Copies of this patent may be obtained for five cents each, by addressing the "Commissioner of Patents, Washington, D. C."